July 26, 1966 R. N. NICOLA 3,263,141
RADIO CONTROLLED PLURAL MOTOR CRANE CONTROL SYSTEM
Filed Feb. 26, 1963 7 Sheets-Sheet 1
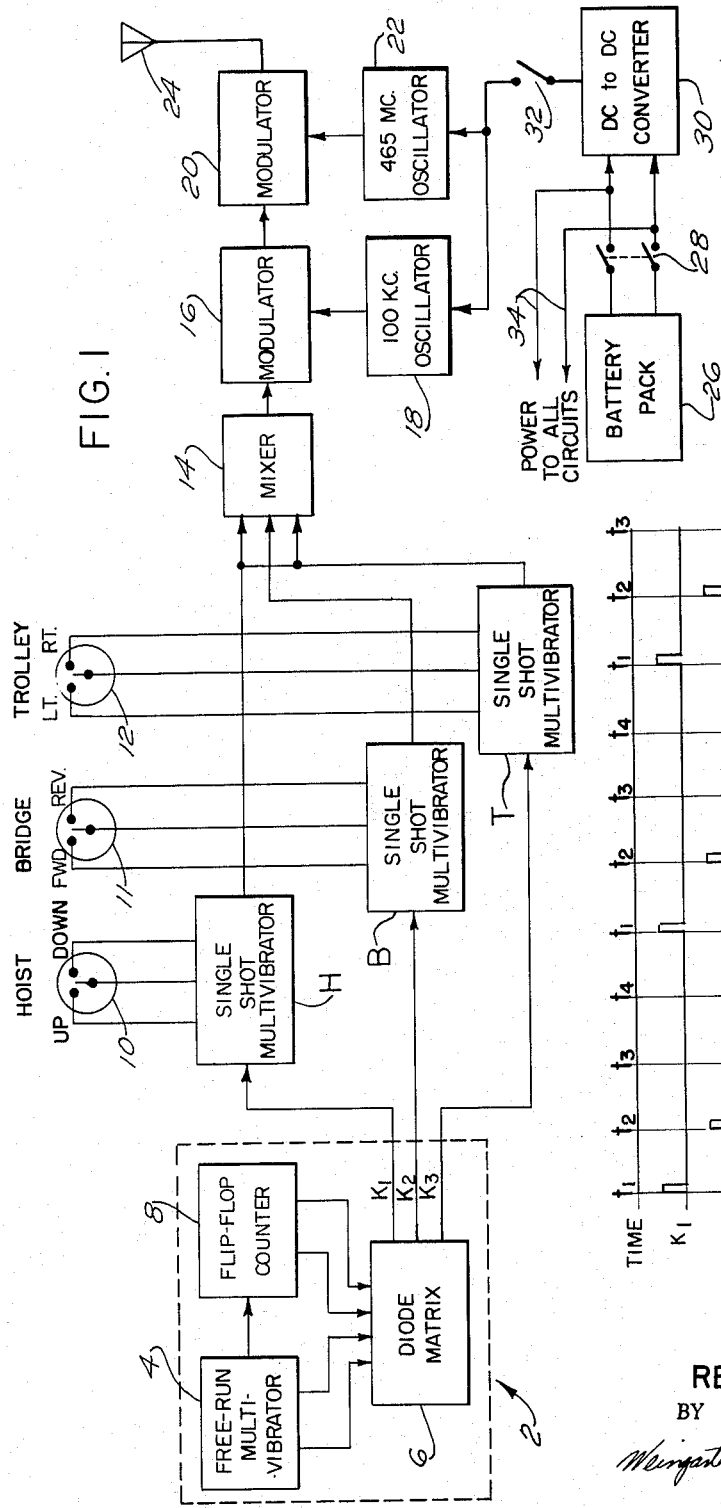
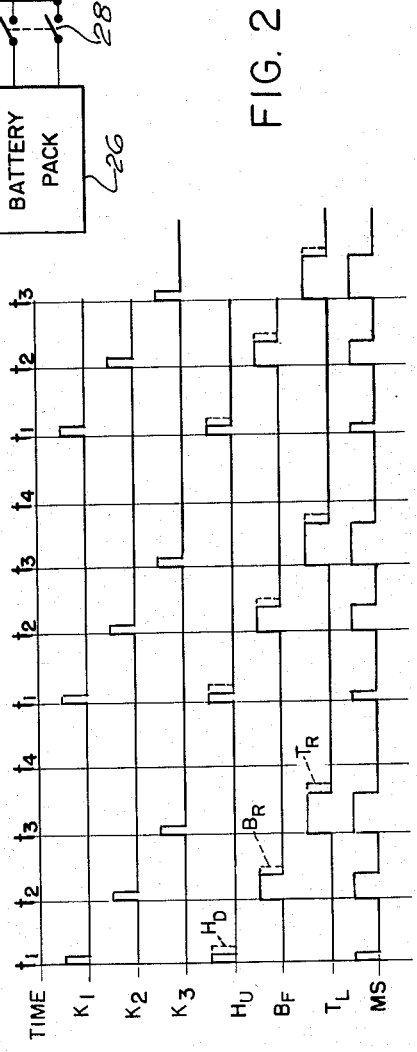
INVENTOR.
RENATO N. NICOLA
BY
ATTORNEYS July 26, 1966

R. N. NICOLA 3,263,141

RADIO CONTROLLED PLURAL MOTOR CRANE CONTROL SYSTEM

Filed Feb. 26, 1963

INVENTOR.
RENATO N. NICOLA
BY
ATTORNEYS

July 26, 1966 R. N. NICOLA 3,263,141
RADIO CONTROLLED PLURAL MOTOR CRANE CONTROL SYSTEM
Filed Feb. 26, 1963 7 Sheets-Sheet 3

INVENTOR.
RENATO N. NICOLA
BY
ATTORNEYS

INVENTOR.
RENATO N. NICOLA

July 26, 1966  R. N. NICOLA  3,263,141
RADIO CONTROLLED PLURAL MOTOR CRANE CONTROL SYSTEM
Filed Feb. 26, 1963  7 Sheets-Sheet 5

INVENTOR.
RENATO N. NICOLA
BY
Weingarten, Orenbach & Pandiscio
ATTORNEYS

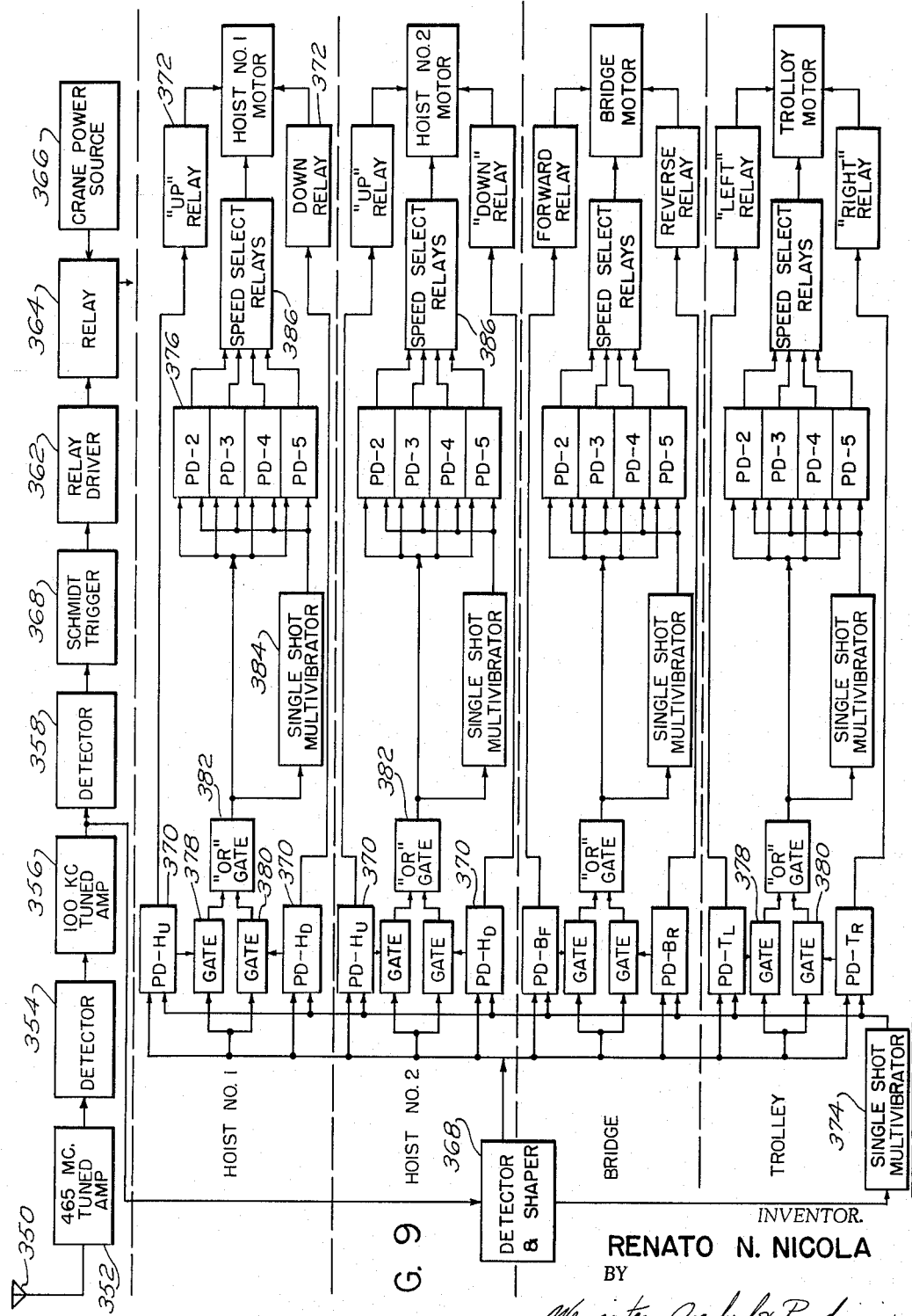

United States Patent Office 3,263,141
Patented July 26, 1966

3,263,141
RADIO CONTROLLED PLURAL MOTOR
CRANE CONTROL SYSTEM
Renato N. Nicola, Manchester, Conn., assignor, by mesne assignments, to Kaman Aircraft Corporation, Bloomfield, Conn., a corporation of Connecticut
Filed Feb. 26, 1963, Ser. No. 261,029
20 Claims. (Cl. 318—16)

This invention relates to motor control systems for material handling apparatus and more particularly to a system for remotely and selectively operating industrial cranes.

The utility of the present invention extends to various types of cranes and similar material-handling equipment but it is particularly applicable to overhead cranes which are necessary tools in a variety of fields, particularly heavy industries such as the steel, automotive, electrical equipment and shipbuilding industries. As its name suggests, an overhead crane is mounted above the work area on a supporting structure. Most overhead cranes are designed to move materials along three axes—up and down, back and forth, and sideways—but some cranes are limited to movement along only one horizontal path. For convenience the invention is described hereinafter in connection with overhead cranes providing material handling movement along the three described axes. A typical three axes overhead crane comprises a bridge unit which is movable back and forth on parallel horizontal tracks, a trolley unit which is mounted on the bridge unit above ground level and is movable horizontally relative to the bridge unit in a direction at right angles to the bridge tracks, and a hoist unit mounted on the trolley and providing controlled vertical movement to a materials holding element such as a hook or bucket. Each of the three units may be driven by its own electric motor or, as an alternative measure, one motor may operate all three units through separate selectively controllable drives.

Heretofore three general types of control systems have been available for overhead cranes. One type is the man-in-cab system which requires that the operator be situated in a cab mounted on the crane above the work area. This type of control system is expensive and is used primarily on large cranes or where it is unsafe or unfeasible for the operator to be at ground level. A second conventional type of crane control is the "pendant cord" system, so called because the operating controls are disposed in a control box which is attached to the bottom end of a cord dangling from the crane. The pendant cord control box is at waist-to-shoulder level from the ground and the operator walks with the control box in hand as the crane moves under his control. While the pendant cord system is less expensive and more convenient to use than the man-in-cab system, it is limited to installations where the operator can walk unimpeded and safely in proximity to the crane. The third system involves a stationary control box at a predetermined location. Its limitations are many, all stemming from the fact that the operator cannot move with the crane. In recognition of the limitations of the foregoing conventional control systems, there has been expressed the need to provide a remote control system which would give the operator complete control over the crane while simultaneously permitting him to move about the work area independently of the crane. Although radio control is the likely solution, prior attempts to achieve a satisfactory remote control system for cranes have been fruitless, due primarily to electrical interference, lack of dependability and insufficient operator control.

Accordingly the primary object of the present invention is to provide a remote control system for a crane which permits movement of the operator independently of the crane while simultaneously assuring complete and accurate control thereover.

A more specific object of the present invention is to provide for materials handling apparatus having a plurality of motor-operated units, a remote control system which permits selective control of each unit when operating alone or simultaneously with another unit.

Another specific object of the present invention is to provide a remote radio control system for cranes and the like which is operative without interference from nearby electrical equipment or stray electromagnetic radiation.

Described briefly a remote control system embodying the present invention will comprise a mobile manually controlled transmitter and a receiver installed on the apparatus to be controlled such as an overhead crane. The transmitter is adapted to generate a carrier signal, modulate the carrier signal with information pulses distinguishable according to information, and radiate the pulse modulated carrier to the receiver. The latter is adapted to demodulate the carrier to extract the information pulses, distinguish the pulses according to information, and cause appropriate units of the crane to remain inoperative or to operate in one of two predetermined ways according to the nature of the information represented by the extracted pulses. The transmitter is adapted to produce separate information pulse waveforms for the controllable units of the crane. These waveforms differ by pulse width and their pulses occur at different equally spaced times without any time overlap between them. The same waveform is used for both directions of movement of the particular crane unit to which it is related, this being possible by automatically changing the pulse width according to direction. In a preferred embodiment of the invention, the several waveforms are mixed and the resultant mixed pulse waveform is then used to modulate an R.F. sub-carrier, e.g. 100 kc. The modulated sub-carrier is then used to modulate a UHF carrier, e.g. 465 mc., which is radiated to the receiver. Because of its frequency the radiated carrier makes possible line-of-sight communication between the transmitter and the receiver. Moreover, since the carrier has a short wavelength, the antennas need not be large, thereby making it possible for the entire transmitter to be carried by the operator. The receiver has a detector which extracts the information pulses and applies them to associated circuitry which separates the extracted pulses according to the controllable crane units to which they relate. With these determinations accomplished the pulses are then used to cause the crane units to which they relate to operate in the appropriate direction. Means are provided to prevent operation of the crane units in the absence of information pulses or in response to stray pulses detected by the receiver. The system is adapted to be battery powered and also can be designed to operate more than one receiver from a single transmitter. By means of the invention it is possible to remote control not only the direction but also the speed of a plurality of reversible multi-speed motors.

Other objects and many of the attendant advantages of the invention will be readily appreciated as the invention becomes better understood by reference to the following detailed description when considered in connection with the accompanying drawings wherein:

FIG. 1 is a block diagram of a portable transmitter of a preferred embodiment of the invention;

FIG. 2 is a timing diagram of significant waveforms produced in different stages of the transmitter unit of FIG. 1;

FIG. 9 is a block diagram of the receiver unit used with the transmitter of FIG. 6.

Figure 3:
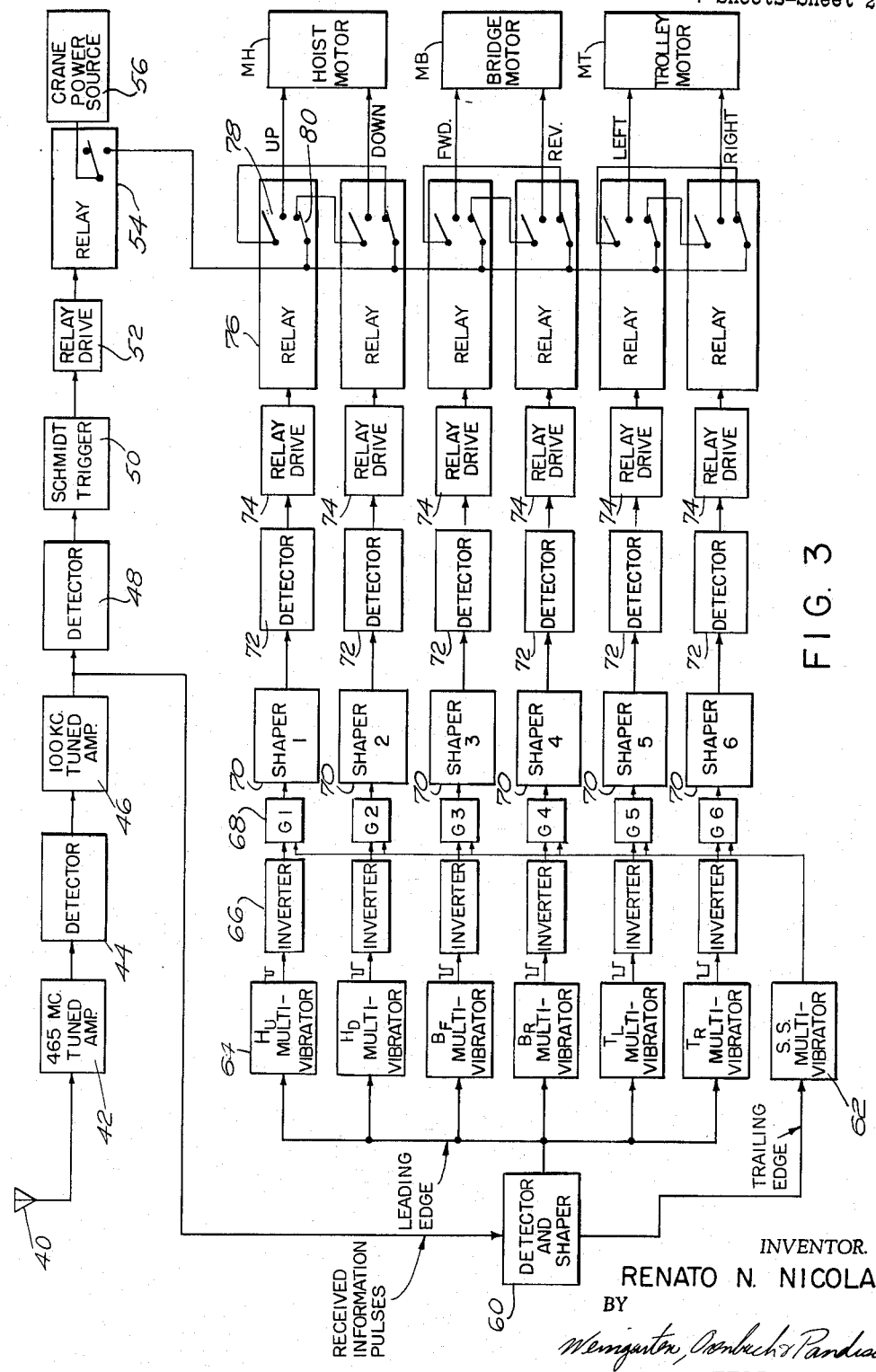
FIG. 3 is a block diagram of the receiver unit of the preferred embodiment of the invention.

Turning now to FIGS. 1 and 2, the transmitter comprises a free-running generator or clock identified generally at 2 which simultaneously produces three identical frequency pulse waveforms $K_1$, $K_2$ and $K_3$ each having a period which may be considered as consisting of four equal time increments $t$ which commence at times $t_1$, $t_2$, $t_3$ and $t_4$. However, the three waveforms are out of phase with each other, waveform $K_1$ having a pulse at time $t_1$, waveform $K_2$ having a pulse at time $t_2$, and waveform $K_3$ having a pulse at time $t_3$. No pulse occurs at time $t_4$. The generator 2 may take various forms but it is preferred that it comprise a free-running multivibrator 4 each side of which feeds a square wave output to a diode matrix 6 and one side of which feeds a square wave output to a flip-flop binary counter 8. The two sides of the latter feed outputs to the diode matrix 6. The matrix generates waveforms $K_1$, $K_2$ and $K_3$ at different output points according to the relative polarities of the inputs thereto from the multivibrator 4 and the counter 8.

The pulse waveforms $K_1$, $K_2$ and $K_3$ are applied to separate single shot multivibrators H, B and T which are operatively controlled by single-pole three position control switches 10, 11 and 12 respectively whose functions are identified by the terms "Hoist," "Bridge" and "Trolley" respectively. Each switch has a center "off" position and two closed positions. The two closed positions of the hoist switch 10 are labelled "Up" and "Down," those for the Bridge switch 11 are labelled "Forward" and "Reverse," and those for the Trolley switch 12 are labelled "Left" and "Right." When switch 10 is in the "Up" position, the multivibrator H produces a pulse train $H_u$ having the same freqeuncy and phase as waveform $K_1$. When switch 10 is in the "Down" position, the multivibrator H produces a pulse train $H_D$ having the same frequency and phase but twice the pulse width as pulse train $H_u$. When switch 11 is in the "Forward" position the multivibrator B produces a pulse train $B_F$ having the same frequency and phase relationship to pulse train $H_u$ as waveform $K_2$ has to waveform $K_1$, but having a pulse width three times as large as that of pulse train $H_u$. When switch 11 is in the "Reverse" position, multivibrator B produces a pulse train $B_R$ having the same frequency and phase as pulse train $B_F$ but a pulse width four times as large as that of pulse train $H_u$. When switch 12 is in the "Left" position, multivibrator T produces a pulse train $T_L$ having the same frequency and phase relationship to pulse train $B_F$ as waveform $K_3$ has to waveform $K_2$, but having a pulse width which is five times as large as that of pulse train $H_u$. Moving switch 12 to the "Right" position causes multivibrator T to produce a pulse train $T_R$ identical in frequency and phase to pulse train $T_L$ but having a pulse width which is six times as large as that of pulse train $H_u$. The means by which these multivibrators are made to have two different pulse widths are described hereinafter in connection with FIG. 8.

The outputs of the three single shot multivibrators are fed to a mixer 14 where they are combined to form a mixed output signal. In FIG. 2 the waveforms $M_S$ is representative of the mixed signal which results when the signals represented by waveforms $H_u$, $B_F$ and $T_L$ are fed to mixer 14. This mixed output is fed to a modulator 16 where it modulates a 100 kc. sub-carrier signal generated by an oscillator 18. The modulated 100 kc. signal is then fed to a modulator 20 where it modulates a 465 mc. carrier generated by a second oscillator 22. The modulated carrier is radiated by an antenna 24 to a complementary receiver unit installed on a crane. This antenna is supported by and portable with the transmitter unit.

The power supply for the above-described transmitter unit comprises a 12 volt battery pack 26 coupled by a double pole single throw switch 28 to a D.C. to D.C. converter 30 which provides a higher voltage output to the two oscillators via a panic switch 32. Battery power is supplied to the other stages of the transmitter via leads 34.

Turning now to FIG. 3, the complementary receiver comprises an antenna 40 which receives the radiated carrier and couples it to a 465 mc. tuned amplifier 42. The latter amplifies the received signal and applies it to a detector 44 where the 100 kc. signal is extracted from the carrier and applied to an amplifier 46 tuned to 100 kc. After amplification the 100 kc. signal is fed to a second detector 48 which generates an output whose D.C. level is proportional to the strength of the carrier signal received by antenna 40. This output is used to fire a Schmitt trigger circuit 50 whose output is fed to a driver circuit 52 for a relay 54 used to control application of electric power from a suitable source 56. The driver circuit 52 is essentially a current amplifier. If the received carrier signal is above a predetermined safe level, the output of detector 48 will have a D.C. level sufficiently high to fire the Schmitt trigger, whereupon the relay driver 52 will energize relay 54. It will keep it energized until the strength of the received signal falls below the predetermined threshold level, at which point the Schmitt trigger will reverse itself and thereby the output of driver 52 will be insufficient to keep the relay energized. When relay 54 is energized its contacts close to connect electric power to the motor circuits of the crane under the control of the receiver circuits hereinafter described. When relay 54 is de-energized, its contacts return to the open circuit position shown in FIG. 3.

Figure 4:
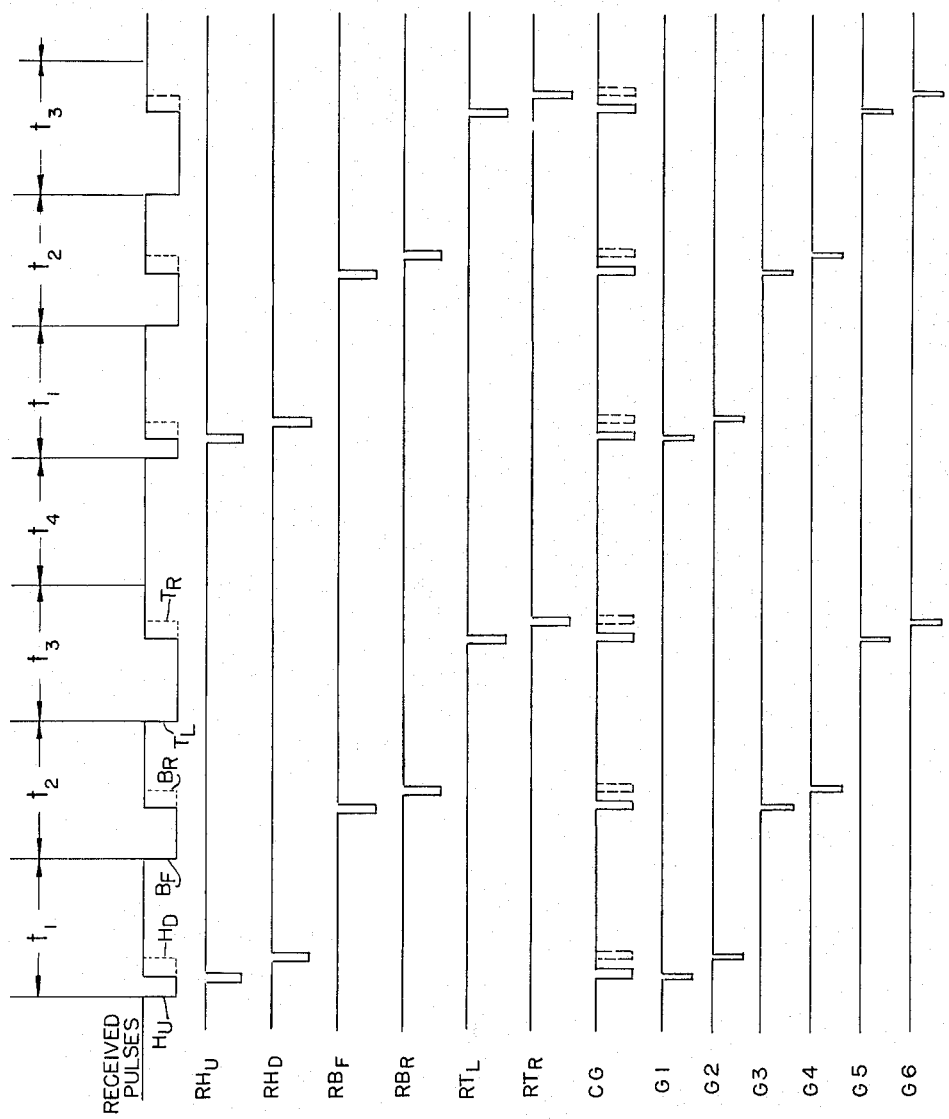
FIG. 4 is a timing diagram of pulse waveforms occurring at different stages of the receiver unit of FIG. 3.

The output of the 100 kc. tuned amplifier 46 also is applied to a detector and pulse shaper circuit 60 which extracts the information pulses from the 100 kc. subcarrier, inverts them, and shapes them for subsequent use. These information pulses are then applied to a single shot multivibrator 62 which produces a control gate pulse CG (FIG. 4) coincident in time with the trailing edge of each information pulse received from the pulse shaper. Simultaneously the same information pulses are fed to six parallel pulse discriminating units each comprising a single shot multivibrator 64, an inverter stage 66 which includes a differentiating circuit on its input side, a gate 68, a shaper 70, a detector 72, a relay drive 74, and a motor control relay 76. These six pulse discriminating channels are identical except for the outputs of their multivibrators 64 which differ in the manner now to be described.

As indicated in FIG. 3 by the legend "$H_u$, $H_D$, $B_F$, $B_R$, $T_L$ and $T_R$," each of the multivibrators 64 is related to a different one of the various species of information signals shown in FIG. 2. This relationship is based on pulse width. By internal adjustment the multivibrators 64 are made to produce outputs of different pulse widths. In response to the leading edge of each information pulse received from shaper 60, the $H_u$ multivibrator 64 will produce a pulse starting at the same time as its input and having a pulse width almost but not quite as large as that of pulses $H_u$ (FIG. 2) produced by the multivibrator H of the transmitter (FIG. 1). At the same time the $H_D$ multivibrator 64 will produce a pulse having a pulse width almost but not quite as large as that of the pulses $H_D$ produced by multivibrator H. The pulses produced by the $H_D$ multivibrator 64 will be wider than those produced by the $H_u$ multivibrator 64. Simultaneously the $B_F$, $B_R$, $T_L$ and $T_R$ multivibrators 64 will produce pulses whose pulse widths are progressively larger and are almost but not quite as wide as the widths of the $B_F$, $B_R$, $T_L$ and $T_R$ pulses respectively generated by the transmitter multivibrators B and T. The outputs of the multivibrators 64 are differentiated in the inverters 66 to get narrow pulses in time coincidence with their trailing edges. After inversion these narrow information pulses are applied to the gates 68. For convenience the individual gates 68 and their outputs are identified in FIGS. 3 and 4 by the designations $G_1$, $G_2$, $G_3$, $G_4$, $G_5$ and $G_6$ and the narrow information pulses applied thereto by the inverters 66 are identified in FIG. 4 by the designations $RH_u$, $RH_D$, $RB_F$, $RB_R$, $RT_L$ and $RT_R$ respectively. As seen from a comparison with the topmost waveform in FIG. 4 which illustrates the relative widths and starting times of the information pulses that are transmitted to the receiver, the pulses $RH_u$ span the trailing edges of the received pulses $H_u$ and the pulses $RH_D$ span the trailing edges of the received pulses $H_D$. The same time relationship exists between the pulses $RB_F$, $RB_R$, $RT_L$ and $RT_R$ and the received pulses $B_F$, $B_R$, $T_L$ and $T_R$. These relationships are due to the fact that the pulses $RH_u$ . . . $RT_R$ are delayed from the leading edges of the transmitted pulses by the time duration of the outputs from the single shot multivibrators 64. At this point it is to be observed that the reason for making the outputs of multivibrator 64 slightly less in width than the transmitted information pulses to which they are related is to make sure that delays caused by circuit parameters will not prevent gate pulses $RH_u$–$RT_R$ from occurring in time coincidence with gate control pulses CG which are generated directly by the trailing edges of the received information pulses and applied to each of the gating circuits 68. Each gating circuit 68 produces an output pulse only when it receives an information gate pulse in time coincidence with a control gate pulse CG. As previously stated, the waveforms $G_1$ to $G_6$ in FIG. 5 illustrate the outputs of gating circuits $G_1$–$G_6$ respectively.

The outputs of the six gating circuits $G_1$–$G_6$ are fed via pulse shaping circuits 70 to separate detectors 72 which are adapted to integrate successive pulses. The D.C. outputs of the detectors are applied to the relay drives 74 to operate motor control relays 76. Each of the relays has a pair of normally open contacts 78 and a pair of normally closed contacts 80 which close and open respectively when the relay is energized by the output of the relay drive associated therewith. Each relay drive 74 will not operate its related relay 76 until the D.C. output of its related detector 72 reaches a predetermined level, which level is reached only if a predetermined number of pulses are integrated within a predetermined period. In practice each relay drive is designed to operate the relay only when ten successive pulses have been integrated within a predetermined short time period.

The relays 76 are arranged to couple power in parallel to three separate reversible motors—a hoist motor MH, a bridge motor MB and a trolley motor MT—from the crane power source via the crane power relay 54. To this end relays 76 are arranged in pairs. Each relay of each pair has its normally closed contacts 80 connected between relay 54 and the normally open contacts of the other relay of the same pair. The two sets of normally open contacts 78 in each pair of relays are connected to the direction-controlling contactors (not shown) of the same reversible motor so that the motor will operate in one direction or the other, depending upon which relay of the pair is energized. As indicated in FIG. 3, when relays 76 of the $H_u$, $B_F$ and $T_L$ signal channels are energized, the hoist, bridge and trolley motors will operate in the "Up," "Forward" and "Left" directions respectively, and when the relays 76 of the $H_D$, $B_R$ and $T_R$ signal channels are energized, the same motors will operate in the "Down," "Reverse" and "Right" directions respectively.

Figure 5:
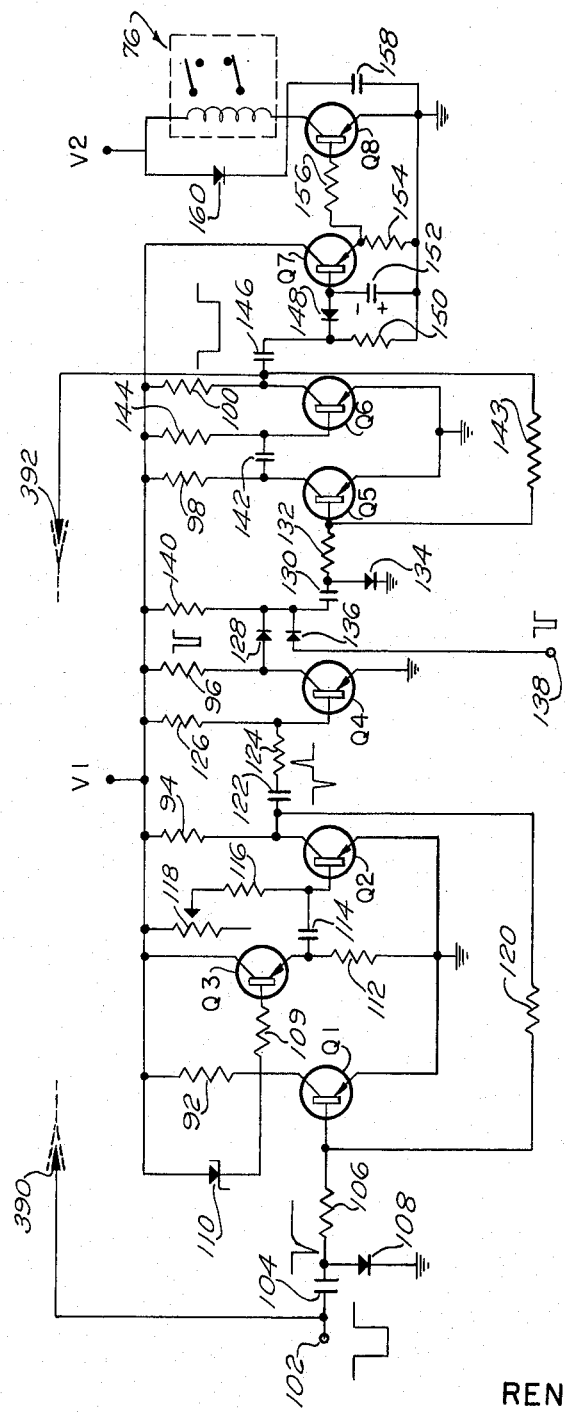
FIG. 5 is a circuit diagram of one of the pulse discriminating channels embodied in the receiver unit of FIG 3.

FIG. 5 shows in detail one of the pulse discriminating channels embodied in the receiver system of FIG. 3. Each of these channels comprises eight PNP transistors Q1–Q8. With the exception of transistors Q3, Q7 and Q8, all of the collectors are connected to a common negative voltage supply V1 through appropriate dropping resistors 92, 94, 96, 98 and 100. Q3 and Q7 operate as emitter followers and their collectors are connected directly to V1. Q8 is a current amplifier and its collector is connected to a second supply voltage V2 via the coil of one of the motor control relays 76. Input pulses from the detector and shaper circuit 60 of FIG. 3 are applied to the pulse discriminator channel at a terminal 102 which is connected to the base of Q1 by a capacitor 104 and a resistor 106 in the order named. The junction of the capacitor 104 and resistor 106 is connected to ground by a diode 108. The emitter of transistor Q1 is tied directly to ground together with the emitter of transistor Q2. The collector of transistor Q1 is coupled to the base of transistor Q3 via a resistor 109. A zener diode 110 is connected across the resistor 92 in the collector circuit of transistor Q1.

The emitter of transistor Q3 is connected to ground by a resistor 112 and is also connected to the base of transistor Q2 by a capacitor 114. The base of transistor Q2 is returned to the supply voltage V1 by a resistor 116 and a variable resistor 118. The collector of transistor Q2 is coupled to the base of transistor Q1 via resistor 120. The collector of transistor Q2 is also connected to the base of transistor Q4 by a capacitor 122 and a resistor 124. The base of transistor Q4 is also connected to the supply voltage V1 by a resistor 126. The emitter of transistor Q4 is connected to ground. The collector of transistor Q4 is connected by a diode 128, a capacitor 130, and a resistor 132 in the order named to the base of transistor Q5. A diode 134 is connected between ground and the junction of capacitor 130 and resistor 132. Connected to the junction of diode 128 and capacitor 130 is a diode 136 which is connected at its positive end to an input terminal 138 to which is applied the output of the single shot multivibrator 62 (FIG. 3) which generates the gate control pulse CG. Connected to the junction of capacitor 130 and diodes 128 and 136 is a resistor 140 leading to the supply voltage V1.

The emitters of transistors Q5 and Q6 are both connected directly to ground. The collector of transistor Q5 is connected to the base of transistor Q6 by a capacitor 142. The base of transistor Q5 is connected to the collector of Q6 via a resistor 143. The base of transistor Q6 is also connected to supply voltage V1 by a resistor 144. The collector of transistor Q6 is coupled to the base of transistor Q7 by a capacitor 146 and a diode 148 in the order named. The junction of capacitor 146 and diode 148 is connected to ground by a resistor 150. The base of transistor Q7 is connected to ground by a capacitor 152 and the emitter of the same transistor is connected to ground by a resistor 154. The emitter of transistor Q7 also is coupled to the base of transistor Q8 by a resistor 156. The emitter of transistor Q8 is connected directly to ground. The emitter of Q8 is also connected to the supply voltage V2 by a capacitor 158 and a diode 160 in the order named.

In the circuit first described the transistors Q1–Q3 comprise a first single shot multivibrator, the capacitor 122 and resistor 124 comprise a differentiating circuit, the transistor Q4 operates as an inverter, the diodes 128 and 136 function as an "and" gate, the stage of transistors Q5 and Q6 constitutes a second single shot multivibrator which functions as a wave shaper, the stage of transistor Q7 functions as a detector, and the circuit of transistor Q8 comprises a driver stage for relay 76. The transistors Q3 and Q7 are connected as emitter followers to facilitate proper impedance matching. The zener diode 110 operates to clamp the voltage swing of the collector of transistor Q1 so as to get a constant output pulse time for the multivibrator. The width of the output pulses from the first multivibrator Q1–Q3 is set by means of the variable resistor 118.

Operation of the circuit of FIG. 5 is as follows: a square negative information pulse applied to terminal 102 from the detector and pulse shaper 60 of FIG. 3 appears at the base of Q1 and the collector of Q2 as a sharp negative spike due to the differentiating action of capacitor 104 and resistor 106. This spike is in phase with the leading edge of the signal applied to terminal 102. The multivibrator comprising transistors Q1, Q2 and Q3 operates through a complete cycle when triggered with the negative spike. The substantially square output pulse of the multivibrator is differentiated by capacitor 122 and resistor 124 to yield sharp negative and positive spikes (FIG. 5) coincident in time with its leading and trailing edges respectively. The positive spike is amplified and inverted by transistor Q4. The transistor Q4 produces a negative square gate pulse which is added to the negative square gate control pulse CG applied to terminal 138. When these gate pulses have time coincidence, the multivibrator Q5, Q6 is fired to produce a relatively wide negative square pulse. This pulse is applied to the base of transistor Q7, charging up the capacitor 152. When the capacitor 152 has been charged to the proper level by a succession of pulses, the transistor Q7 will conduct and cause Q8 to energize thereby. The transistor Q7 will continue to conduct as long as the voltage on capacitor 152 is sufficiently negative. If the pulses received by the base of transistor Q7 are interrupted, capacitor 152 will begin to discharge through the transistor Q7 and the resistor 154 and its voltage will decrease sufficiently to terminate operation of Q7 and thereby deenergize the relay. Q7 will remain nonconducting until diode 148 has again passed a series of pulses sufficient to charge capacitor 152 up to the aforesaid proper level. The capacitor 158 acts to kill any ripple while the diode 160 acts as a damper.

It is believed to be apparent that the system shown in FIGS. 1 and 3 permits directional control of three motors simultaneously, each operating at a single speed of operation. Moreover, using the same principles, the invention is adaptable to controlling more than three motors at more than one speed. An additional motor may be controlled with only minor changes because of the fact that the timing period shown in FIG. 2 includes a time interval commencing at time $t_4$ which is unused. This time interval may be used for a direction information pulse relating to a fourth motor. Extending the above-described system so as to operate one or more motors at any one of a plurality of speeds is made possible by reserving for each motor an information time interval substantially larger than the time interval required for the pulses $H_u \ldots T_R$ just described so as to accommodate an additional pulse which determines the speed of operation of the same motor. The exact speed at which a particular motor is to be operated may be determined by the pulse width of the speed information pulse. Such a system is illustrated in FIGS. 6–9.

FIGS. 6 through 9 show a system for controlling a crane having four motors each adapted to operate at any one of five speeds. One motor operates the bridge, another motor operates the trolley, and the other two motors operate separate hoists.

Figure 6:
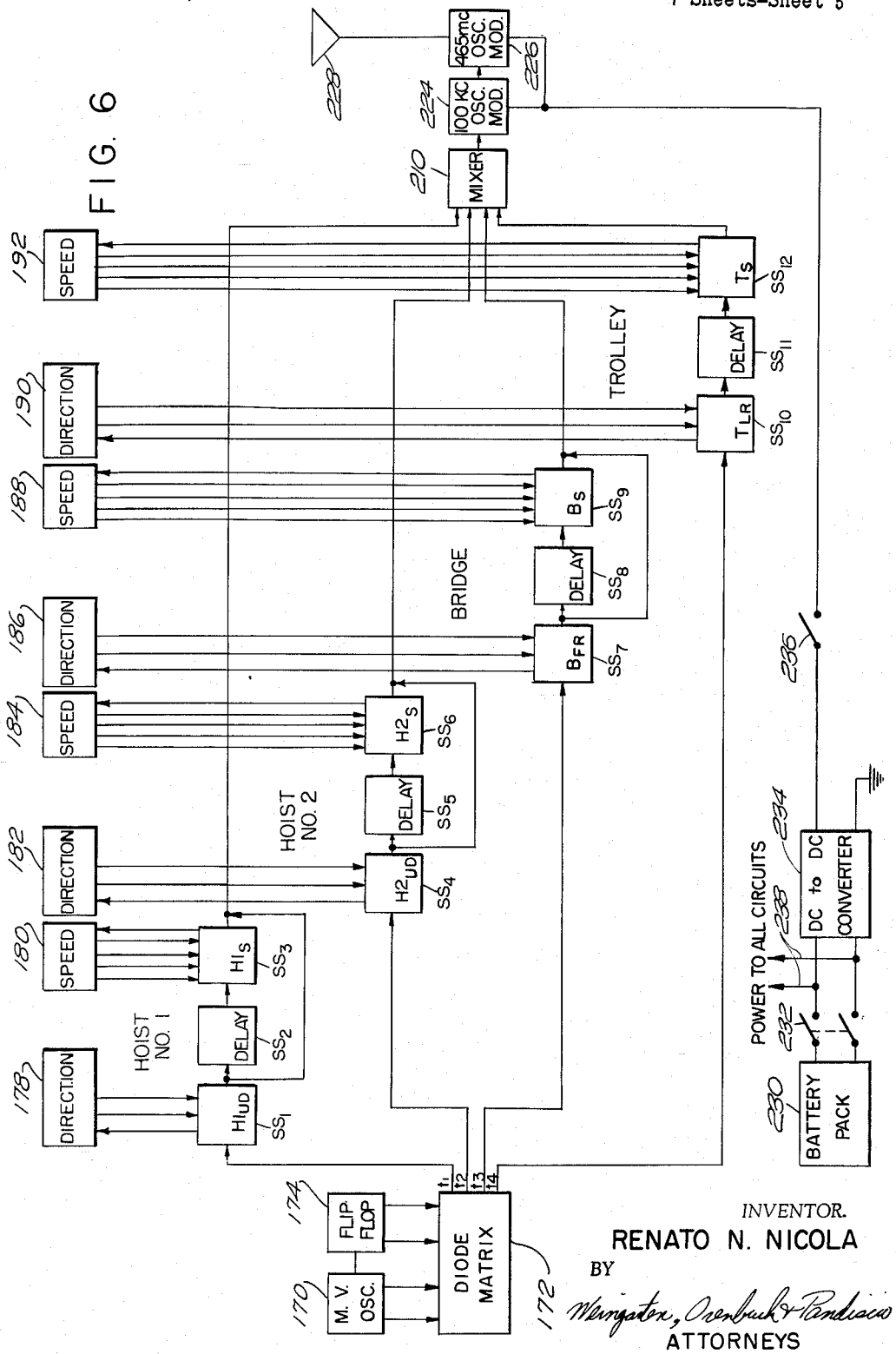
FIG. 6 is a block diagram of the transmitter of another embodiment of the invention.

Turning now to FIG. 6, the transmitter of the multi-speed system comprises a free running generator or clock taking the form of a free running multivibrator 170, each side of which feeds a square wave output to a diode matrix 172 and one side of which feeds a square wave output to a flip-flop binary counter 174. Outputs are fed from the two sides of the flip-flop counter 174 to the diode matrix 172. The diode matrix generates four identical frequency pulse waveforms which are out of phase with each other, one waveform having a pulse at time $t_1$, another waveform having a pulse at time $t_2$, the third waveform having a pulse at time $t_3$, and the fourth waveform having a pulse at time $t_4$. The timing pulses generated by the diode matrix are used to key four groups of single shot multivibrators each controlled by a pair of manually actuated switch units. These switch units are illustrated schematically in FIG. 6 at 178, 180, 182, 184, 186, 188, 190 and 192. In practice these switch units are embodied in a single control box with the function and settings of each unit designated by appropriate legend.

Figure 7:
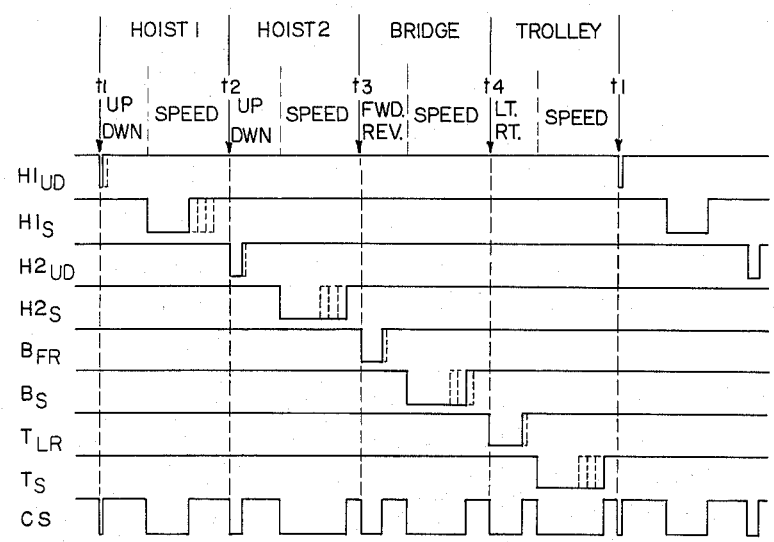
FIG. 7 is a timing diagram of significant waveforms produced in different stages of the transmitter of FIG. 6.

Switch unit 178 controls the starting and stopping and also the direction of the motor of hoist 1 and switch unit 180 controls the speed of the same motor. Operatively associated with switch units 178 and 180 are three single shot multivibrators $SS_1$, $SS_2$ and $SS_3$. The function of the single shot multivibrator $SS_1$, is to produce an information pulse which determines whether the motor of hoist 1 is to operate in the "up" or "down" direction. This function is indicated by the legend $H1_{UD}$ in FIG. 6. Multivibrator $SS_1$ operates in response to the pulse output from diode matrix 172 which occurs at time $t_1$. Multivibrator $SS_2$ operates in response to the output of multivibrator $SS_1$. The output of multivibrator $SS_2$ is used to operate multivibrator $SS_3$. Multivibrator $SS_2$ functions as a delay element, causing multivibrator $SS_3$ to operate a predetermined time interval after multivibrator $SS_1$. Switch unit 178 is the same as switches 10, 11 and 12 of FIG. 1, being essentially a three position switch with one off position and two closed positions. The closed positions are identified as "up" and "down." When the switch 178 is in the "up" position, multivibrator $SS_1$ will produce a pulse of predetermined width at time $t_1$ and when the switch 178 is in the "down" position, the same multivibrator will produce at time $t_1$ a pulse whose width is twice the aforesaid predetermined width. This relationship is seen in FIG. 7 by the waveform identified as $H1_{UD}$. The pulse width shown in full lines is the pulse generated when switch 178 is in the "up" position and the pulse indicated by the broken line is the one generated when switch 178 is in the "down" position. The other switch unit 180 is adapted to permit manual selection of five different switch settings, a different setting for each motor speed. Normally switch unit 180 is in the "1" or "low" speed setting. In this position, no pulse output is produced by multivibrator $SS_3$. However, when the switch unit 180 is in the "2" speed setting multivibrator $SS_3$ will produce a pulse output which is delayed in time from the pulse output of multivibrator $SS_1$ by an amount determined by multivibrator $SS_2$. Moving the switch unit 180 to the "3," "4" and "5" speed settings will cause the pulse output of multivibrator $SS_3$ to decrease in width by predetermined increments. This relationship is shown in FIG. 7 by the waveform $H1_S$. The pulse shown in dark lines is the one generated when switch unit 180 is in the "5" position. The increasing pulse widths shown by the broken lines are characteristic of the switch settings "4," "3" and "2" respectively. At this point it is to be observed from FIG. 7 that the pulse of the waveform $H1_S$ commences after the pulse of the waveform $H1_{UD}$ produced by the single shot multivibrator $SS_1$ but terminates before time $t_2$.

Switch unit 182 controls starting and stopping and also the direction of the motor of hoist 2. Accordingly switch unit 182 is the same as switch unit 178, but it controls operation of a multivibrator $SS_4$ which is keyed by the pulse output of the diode matrix occurring at time $t_2$. When switch unit 182 is in the "up" position, it causes multivibrator $SS_4$ to produce at time $t_2$ a pulse whose width is three times the width of the pulse produced at time $t_1$ when the switch unit 178 is in the "up" position. When switch unit 182 is in the "down" position, multivibrator $SS_4$ produces at time $t_2$ a pulse which is four times as wide as the pulse produced by multivibrator $SS_1$ when switch unit 178 is in the "up" position. These pulses are shown in FIG. 7 by the waveform $H2_{UD}$, the width of the "down" pulse being shown in broken lines.

The output of multivibrator $SS_4$ is used to operate a multivibrator $SS_5$ which controls operation of a third multivibrator $SS_6$. Multivibrator $SS_5$ corresponds in function to multivibrator $SS_2$, causing the multivibrator $SS_6$ to operate after a predetermined time delay. The multivibrator $SS_6$ is identical to multivibrator $SS_3$, producing different widths according to the setting of switch unit 184 which is identical to switch unit 180. The output pulse waveform of $SS_6$ is identified in FIG. 7 as $H2_S$, the pulse shown in dark lines representing the pulse width when the switch unit 184 is in the "2" or second lowest speed position. The broken lines indicating how the pulse width narrows as the switch unit is moved through the "3," "4" and "5" positions in that order. The different selectable widths of the $H2_S$ pulse differ by the same increments as the different widths of the $H1_S$ pulse.

Switch units 186 and 188 are identical to switch units 178 and 180 respectively but control the bridge motor. These units directly control single shot multivibrators $SS_7$, $SS_8$ and $SS_9$. Multivibrator $SS_7$ is keyed by the output of the diode matrix occurring at time $t_3$. The multivibrator $SS_8$ is operated by the output of multivibrator $SS_7$ and in turn operates the multivibrator $SS_9$ after a predetermined time delay. The three positions of switch unit 186 are "off," "forward" and "reverse." In the "off" position, multivibrator $SS_7$ will not produce any output. In the "forward" position, multivibrator $SS_7$ will produce a pulse occuring at the time $t_3$ having a pulse width 5 times as large as the width of the pulse generated by multivibrator $SS_1$ when switch unit 178 is in the "up" position. When switch 186 is in the "reverse" position, multivibrator $SS_7$ will produce a pulse six times as wide as the pulse produced by $SS_1$ when switch unit 178 is in the "up" position. The output of $SS_7$ is shown in FIG. 7 by the waveform $B_{FR}$. The multivibrator $SS_9$ is identical to multivibrators $SS_3$ and $SS_6$, producing pulses of four different widths according to the setting of switch unit 188. The output waveform of $SS_9$ is shown in FIG. 7 at $B_S$. The different pulse widths obtainable with multivibrator $SS_9$ are the same as the pulse widths obtainable with multivibrators $SS_3$ and $SS_6$.

Operation of the trolley motor is determined by switch units 190 and 192 which are identical to switch units 186 and 188 just described except that the three positions of switch unit 186 are designated "off," "left" and "right." Operatively associated with and controlled by these switch units are three multivibrators $SS_{10}$, $SS_{11}$ and $SS_{12}$. Multivibrator $SS_{10}$ is keyed by the output of the diode matrix occurring at time $t_4$. Multivibrator $SS_{11}$ is operated by multivibrator $SS_{10}$ and its output causes operation of multivibrator $SS_{12}$ after a predetermined time delay. Multivibrator $SS_{10}$ produces a pulse seven times as wide as the "up" pulse produced by multivibrator $SS_1$ when switch unit 190 is in the "left" position and a pulse which is eight times as wide when switch unit 190 is shifted to the "right" position. The output of multivibrator $SS_{10}$ is shown at $T_{LR}$ in FIG. 7.

Multivibrator $SS_{12}$ is identical to multivibrators $SS_3$, $SS_6$ and $SS_9$, producing pulses of the same several widths at corresponding positions of its controlling switch unit 192. The output waveform of $SS_{12}$ is shown at $T_S$ in FIG. 7. FIG. 7 also shows how the direction and speed control pulses for the same motor fall within the same time block and do not overlap into adjacent time blocks. This is achieved by having the multivibrators $SS_2$, $SS_5$, $SS_8$ and $SS_{11}$ introduce successively smaller amounts of delay to compensate for the successively greater width pulses produced by multivibrators $SS_1$, $SS_4$, $SS_7$, and $SS_{10}$ respectively. As used herein, a time block is the time interval reserved for information pulses of one motor, e.g. the time $t_1$ to time $t_2$ in FIG. 7 pertaining to the motor of hoist 1.

Referring back again to FIG. 6, the outputs of multivibrators $SS_1$, $SS_3$, $SS_4$, $SS_6$, $SS_7$, $SS_9$, $SS_{10}$ and $SS_{12}$ are fed to a mixer 210 to produce a combined signal CS (FIG. 7) which is fed to an oscillator-modulator 224 where it modulates a 100 kc. sub-carrier signal. The modulated sub-carrier is fed to an oscillator-modulator 226 where it modulates a 465 kc. carrier. The modulated carrier is radiated by an antenna 228 to a complementary receiving unit installed on a crane.

The power supply for the above-described transmitting unit is essentially the same as the power supply for the transmitting unit shown in FIG. 1, comprising a 12 volt battery pack 230 which is coupled by a double pole single throw switch 232 to a D.C. to D.C. converter 234 which provides a higher voltage output to the two oscillators via a panic switch 236. Power to the other circuits is supplied via leads 238.

Figure 8:
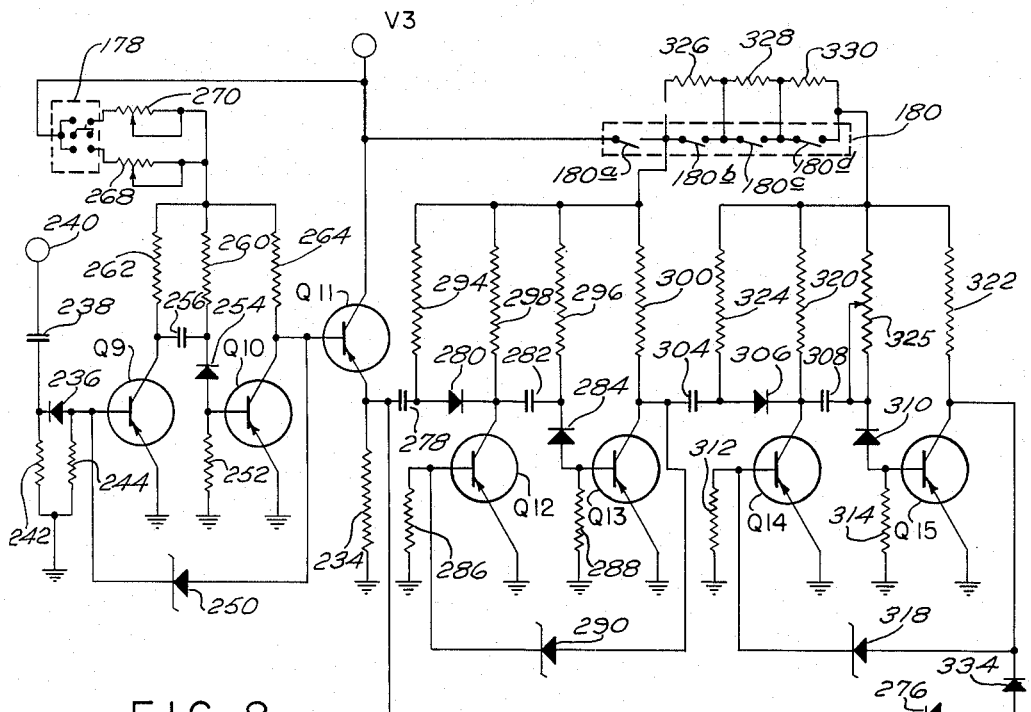
FIG. 8 is a circuit diagram of one of the manually controlled signal generating stages of the tranmitter of FIG. 6.

FIG. 8 is a circuit diagram of the multivibrators $SS_1$, $SS_2$ and $SS_3$ embodied in the transmitter shown in FIG. 6. The illustrated circuit comprises seven PNP transistors Q9–Q15. Multivibrator $SS_1$ comprises transistors Q9 and Q10, and multivibrator $SS_2$ comprises transistors Q12 and Q13, and multivibrator $SS_3$ comprises transistors Q14 and Q15. Transistor Q11 is connected as an emitter follower for proper impedance match between Q9, Q10, and Q12, Q13. Accordingly the emitter of Q11 is connected to ground via a resistor 234 and its collector is connected directly to a voltage source V3, while the emitters of the other transistors are grounded.

The base of Q9 is connected by a diode 236 and a capacitor 238 in the order named to an input terminal 240 to which is applied the output from diode matrix 172 occurring at time $t_1$. Connected between ground and the two ends of diode 236 are resistors 242 and 244. The same input also is applied to the collector of Q10 via a zener diode 250. The base of Q10 is connected to ground by a resistor 252 and to the collector of Q9 by a diode 254 and a capacitor 256. The junction of diode 254 and capacitor 256 and the collectors Q9 and Q10 are connected by resistors 260, 262 and 264 respectively to a voltage source V3 by way of a variable resistor 268 or another variable resistor 270 as determined by the manually operated switch unit 178. Resistors 268 and 270 are set so that the multivibrator output at the collector of Q10 will have a predetermined pulse width when switch unit 178 is closed to resistor 168 and a pulse width two times as great when switch 178 is closed to resistor 170. The output is applied to the base of Q11. The signal appearing at the emitter of Q11 is applied to transistors Q12 and Q13 and also to an output terminal 274 via a diode 276.

The signal from Q11 is applied to the collector of Q12 via a capacitor 278 and a diode 280. The collector of Q12 is connected to the base of Q13 by a capacitor 282 and a diode 284. The bases of Q12 and Q13 are connected to ground by resistors 286 and 288 respectively. A zener diode 290 connects the base of Q12 and the collector of Q13. The junction of capacitor 278 and diode 280, the junction of capacitor 282 and diode 284, and the collectors of Q12 and Q13 are connected to voltage source V3 by parallel resistors 294, 296, 298 and 300 respectively connected in series with a normally open switch 180a which forms part of switch unit 180. Transistors Q12 and Q13 will not operate unless switch 180a is closed. If it is closed, an input pulse from Q11 will produce an output pulse at the collector of Q13 after a time delay determined by the values of the RC components connected to Q12 and Q13.

The output at the collector of Q13 is applied to the collector of Q14 by a capacitor 304 and a diode 306. The collector of Q14 is connected to the base of Q15 by a capacitor 308 and a diode 310. The two bases are connected to ground by resistors 312 and 314. Additionally the base of Q14 is tied to the collector of Q15 by a zener diode 318. The collectors of Q14 and Q15, the junction of capacitor 304 and diode 306, and the junction of capacitor 308 and diode 310 are coupled to voltage source V3 by parallel fixed resistors 320, 322, 324 and variable resistor 325 respectively in series with three fixed resistors 326, 328 and 330 and switch 180a. Connected in series with switch 180a across resistors 326, 328 and 330 are normally open switches 180b, 180c and 180d respectively which form part of switch unit 180. Switches 180a, b, c and d are arranged to close in the order named and to reopen in the reverse order. Transistors Q14 and Q15 will not operate unless switch 180 is closed. When this occurs an output pulse will occur at the collector of Q15 in response to a pulse input from the collector of Q13. When switch 180b is closed, resistor 326 will be shorted out; this changes the RC value and thereby causes a reduction in the width of the output pulse occurring at the collector of Q15. Successive closing of switches 180c and 180d causes the pulse width to be narrowed by two additional increments. The output pulse is applied to output terminal 274 via a diode 334.

The other groups of multivibrators shown in FIG. 6 also embody the circuit of FIG. 8 but with minor changes to achieve the desired pulse width and time delay. Altering the values of capacitor 256 and resistor 260 permits adjustment of the width of the direction information pulses generated by multivibrators $SS_4$, $SS_7$ and $SS_{10}$. Varying the values of capacitor 282 and resistor 296 provides the delays effected by multivibrators $SS_5$, $SS_8$ and $SS_{11}$. Eliminating the multivibrator stages $SS_2$ and $SS_3$ from the circuit of FIG. 8 yields a multivibrator circuit corresponding to the multivibrators H, B and T of the embodiment of FIG. 1.

The receiver for processing the information signals of the transmitter shown in FIG. 6 is shown in FIG. 9. This unit embodies essentially the same stages as the receiver of FIG. 3, plus additional stages for handling the speed information signals. Thus, as shown in FIG. 9, the receiver comprises an antenna 350 which receives the radiated carrier and couples it to a 465 mc. tuned amplifier 352. The latter amplifies the received signal and applies it to a detector 354 where the modulated 100 kc. sub-carrier is extracted from the carrier and applied to an amplifier 356 tuned to 100 kc. After amplification the 100 kc. signal is fed to a second detector 358 which generates an output whose D.C. level is proportional to the strength of the signal received by antenna 350. This output is used to fire a Schmidt trigger circuit 360 whose output is fed to a driver circuit 362 for a relay 364 used to control application of electric power to a plurality of motor control relays from a suitable source 366. The driver circuit 362 is essentially a current amplifier. Thus, as in the embodiment of FIG. 3, if the received signal is above a predetermined safe level, the output of detector 358 will have a D.C. level sufficiently high to fire the Schmitt trigger, whereupon the relay driver 362 will energize relay 364. The relay 364 will remain energized until the strength of the received signal falls below the predetermined theshold level, at which point the Schmitt trigger 360 will reverse itself and thereby the output of the driver circuit 362 will be insufficient to keep the relay energized. The contacts of relay 364 are normally open and close only when the relay is energized. Thus in the absence of a signal having a strength above the predetermined threshold level, no power will be transmitted to the control circuits for the various motors of the crane.

The output of the 100 kc. tuned amplifier 356 also is applied to a detector and pulse shaper circuit 368 which extracts the information pulses from the 100 kc. subcarrier, inverts them, and shapes them for use by the control circuits now to be described. These control circuits are pulse discriminator circuits like the one shown in FIG. 5, with certain of the pulse discriminator circuits of FIG. 9 including an additional gate circuit as hereinafter described.

The output from the detector and shaper 368 is applied to each of six pulse discriminator circuits 370 adapted to discriminate pulses representing motor direction and to operate relays 372 controlling motor direction. Each of the discriminators 370 is set to discriminate a particular pulse width in the manner described previously in connection with FIGS. 3–5. The discriminators which handle the "up" signals for hoist 1 and hoist 2 are identified as $PD-H_u$. The discriminators for the same hoists which handle the "down" signals are identified as $PD-H_D$. The discriminators which handle the "forward" and "reverse" signals for the bridge are identified as $PD-B_F$ and $PD-B_R$ respectively. The discriminators which handle the "left" and "right" signals for the trolley are identified as $PD-T_L$ and $PD-T_R$. To each of these discriminators is also fed the output of a single shot multivibrator 374 which produces a gate control pulse in response to the trailing edge of each information pulse passed by the detector and shaper unit 368. The multivibrator 374 corresponds to the multivibrator 62 shown in FIG. 3.

In addition to controlling operation of motor direction control relays 372, pulse discriminators $PD-H_u$ . . . $PD-T_R$ monitor the received information pulses to determine if a direction control information pulse is accompanied by a speed control information pulse. If a speed control pulse is determined to be present, it is allowed to pass to four different speed pulse discriminators 376 identified as PD-2, 3, 4 and 5. The numeral following the designation "PD" indicates the motor speed which is controlled by that particular discriminator. In this connection it is to be observed that the same four speed pulse discriminators are used for the speed signals for both directions of movement of a particular motor.

The only signals which reach the speed pulse discriminators are the speed pulses, this control being made possible by applying the received information pulses to gate circuits 378, 380 which are controlled by the pulse discriminators $PD-H_u$ . . . $PD-T_R$. These gates will pass information pulses to the speed pulse discriminators only in time coincidence with enabling or conditioning gate pulses received from the pulse discriminators $PD-H_u$ . . . $PD-T_R$. For proper control the gates 378, 380 must be enabled long enough to pass a complete speed pulse and must be disabled again before the next direction information pulse received from the detector and shaper 368. This control is achieved by enabling each gate 378, 380 with the wide pulse produced by the shaper stage of the associated discriminator 370, i.e. the wide pulse output occurring at the collector of transistor Q6 in FIG. 5. Since this wide pulse output commences in time coincidence or shortly after the trailing edge of the direction information pulse which produced it, it will occur before or at the same time as a speed control pulse. By making the output of the pulse shaper sufficiently wide, a gate 378 or 380 will be enabled long enough to pass a speed control pulse. On the other hand, the enabling pulses obtained from the discriminator 370 must be sufficiently sharp to shut off the gates 378, 380 before the time of the next information pulse. The outputs of the gates 378 and 380 are applied to the speed pulse discriminators by way of "OR" gates 382. Simultaneously the output pulses passed by the "or" gates 382 are fed to single shot multivibrator 384 which produces gate control pulses in response to the trailing edges of said output pulses. Multivibrators 384 correspond in function to multivibrator 374.

The speed pulse discriminators 376 are the same as the discriminators $PD-H_u$ . . . $PD-T_R$, differing therefrom only in the width of the pulses produced by the multivibrator stages thereof, i.e. the output from the collector of transistor Q2 in FIG. 5. The outputs of their multivibrator stages are set to correspond in width to the widths of the speed control pulses provided by the complementary transmitter unit of FIG. 6. Only one speed pulse discriminator will produce an output at a time, depending upon the width of the speed pulse input. The speed pulse discriminators are coupled to different speed select relays identified as a group at 386. These relays control the speed of the particular motor to which the speed signals relate. When no speed signals are passed by the gates 378, 380 the motors will operate at their lowest speed. When speed signals are passed by gates 378, 380, the speed of the motors will be determined by the width of the speed pulse, the widest speed pulse resulting in an output from the pulse discriminator PD–2 and the narrowest speed pulse resulting in an output from the speed discriminator PD–5.

It is believed to be apparent that the system of FIGS. 6–9 affords simultaneously selective control of four variable speed motors located remotely from the operator. Moreover, like the system of FIGS. 1–5, the line of sight communication afforded by the high frequency of the carrier permits automatic lockout of the receiver when the signal level drops below a predetermined value. Since the antennas are relatively small due to the short carrier wavelength, and because electronics lends itself to miniaturization and solid state components, the transmitter can be made relatively small and compact. In practice the transmitter is adapted to be strapped on the operator's back and the manually operated switches are assembled in a single box adapted to be hung on a belt at the waist and having a cable which plugs into the transmitter pack. Alternatively the transmitter may be supported on a portable floor stand. A further advantage is that more than one transmitter may be provided for each installation, thereby permitting alternative or sequential operator control. The receiver also is easy to mount on the crane, being rugged and dependable. Due to the choice of frequencies, the modulation of carrier and sub-carrier, and the requirement that a predetermined number of pulses be received for a relay driver to energize a motor control relay, the receiver system is responsive only to signals transmitted by the transmitter under the operator's control.

A further advantage is that essentially the same kind of pulse discriminator may be used for the systems of FIGS. 3 and 9. In this connection it is to be noted that in practice the discriminators are fabricated as separate plug-in printed board units, with plug-in connectors 390 and 392 as shown in FIG. 5 to facilitate application of information and gate enabling pulses to gate circuits 378, 380.

It also is contemplated that the multivibrators in the transmitter units, e.g. multivibrators H, B and T in FIG. 1, need not be adapted to produce pulses of more than one width. Instead a different multivibrator may be used for each different pulse width.

Also to be understood is the fact that the system need not be designed for three or more motors. It may operate only one motor. It also may handle one or more single speed and one or more multi-speed motors simultaneously. The widths of the time blocks reserved for signals for each motor may be altered according to the demands of the system.

A further advantage of the present system is that it is adapted for operation in a bandwidth of 462.525 to 467.575 megacycles. Currently this is the Class B Citizens Radio Band which involves a minimum of FCC licensing problems and permits a power level which is satisfactory for the industrial installations contemplated for the invention.

Also of paramount consideration are the cost and operating advantages afforded by the invention. Fewer persons are required to achieve control of a single crane where visibility of accessibility is limited. Moreover the control is instantaneous and no dangerous time lag is involved in relaying signals. Danger to personnel is eliminated by permitting the operator to move independently and remotely of the crane.

The present system also is not limited to tri-directional overhead cranes. It may be adapted for cranes providing movement along only one or two axes. It also is applicable to locomotives, derricks, vehicular cranes, power shovels, fork-lift trucks, laterally and vertically movable elevators, and related types of materials-handling equipment.

Having described the invention, various modifications and improvements will now occur to those skilled in the art. Therefore, the invention disclosed herein should be construed as limited only by the spirit and scope of the appended claims:

I claim:

1. In combination with a crane having three operating motors, a system for remotely controlling said motors comprising an operator-controlled transmitter located away from said crane and a receiver mounted on said crane; said transmitter comprising means for generating a carrier signal, first operator-controlled means for generating a first train of evenly spaced pulses, a second operator-controlled means for generating a second train of evenly spaced pulses displaced timewise from the pulses of said first train; third operator-controlled means for generating a third train of evenly spaced pulses displaced timewise from the pulses of said first and second trains, means for modulating said carrier with said pulse trains, and means for radiating the modulated carrier; said receiver comprising means for receiving the radiated modulated carrier and for deriving therefrom a detected signal constituting all of the pulses of said pulse train, means responsive to all of said pulses in said detected signal to generate a control pulse train, means responsive to all of said pulses in said detected signal to generate first, second and third pulsed timing signals, means responsive to both said control pulse train and said first, second and third pulsed timing signals for extracting pulses according to said original first, second third transmitted pulse trains, means responsive to extracted first train pulses for controlling one of said motors, means responsive to extracted second train pulses for controlling a second one of said motors, and means responsive to extracted third train pulses for controlling a third one of said motors.

2. The combination of claim 1 wherein said transmitter includes means for varying the pulse width of one of said pulse trains; and further wherein said receiver includes means for discriminating the pulses of said one pulse train according to width, and means responsive to said discriminated pulses for reversing the direction of the respective one of said motors when the width of said discriminated pulses in said one pulse train varies by a predetermined increment.

3. Remotely controlled materials-handling apparatus comprising (1) an overhead crane having a hoisting element and first, second and third drive means responsive to applied electrical control signals for causing said hoisting element to move longitudinally, sideways and vertically respectively; (2) an operator-controlled transmitter remote from said crane for radiating electrical command signals; and (3) a receiver mounted on said crane for controlling operation of said drive means in response to command signals from said transmitter; said transmitter comprising means for generating three distinct pulse trains with each pulse train consisting of evenly spaced pulses displaced timewise from the pulses of the other pulse trains, operator-controllable means for selectively initiating and terminating generation of said pulse trains, a mixer, means for applying said pulse trains to said mixer to produce a mixed pulse signal train, means for generating a sub-carrier signal, means for modulating said sub-carrier signal with said mixed pulse signal train, means for generating a carrier signal, means for modulating said carrier signal with said modulated sub-carrier, and means for radiating said modulated carrier signal, said receiver comprising means for demodulating said carrier to recover said modulated sub-carrier, means for demodulating said sub-carrier to recover said mixed pulse signal train; means for segregating the pulses in said recovered mixed pulse signal train to reconstitute said three distinct pulse trains, first means responsive to one of said reconstituted pulse trains for applying an electrical control signal to said first drive means whereby to cause said hoist to move longitudinally for a distance determined by the time duration of said one reconstituted pulse train, second means responsive to a second one of said reconstituted pulse trains for applying another electrical control signal to said second drive means whereby to cause said hoist to move sideways for a distance determined by the time duration of said second reconstituted pulse train; and third means responsive to a third one of said reconstituted pulse trains for applying still another electrical control signal to said third drive means whereby to cause said hoist to move vertically for a distance determined by the time duration of said third reconstituted pulse train.

4. Apparatus for remotely controlling a plurality of motors comprising means for generating $n$ trains of timing pulses with each train having a period of $kT$, and out of phase with other trains of timing pulses by a time interval equal to a whole multiple of $T$ less than $kT$, $n$ and $k$ being integers with $n$ having a maximum value equal to $k$, means for generating a first motor control signal pulse in response to each timing pulse of one of said trains of timing pulses within a time interval $T$ of said each timing pulse, means for generating like first motor control signal pulses in response to pulses of the rest of said $n$ trains of timing pulses, means for mixing the trains of said first motor control signal pulses to produce a mixed signal pulse train, means for transmitting said mixed signal pulse train, means for receiving said mixed signal pulse train and for reconstituting therefrom said trains of first motor control signal pulses, means responsive to said reconstituted trains of first motor control signal pulses for controlling one mode of operation of a different motor with each separate reconstituted train of first motor control signal pulses, means for generating a second motor control signal pulse in response to each pulse of said one train of timing pulses within a time interval $T$ of said each timing pulse but separated in time from the first motor control signal generated by said each timing train pulse, means for generating like second motor control signal pulses in response to pulses of the rest of said $n$ trains, means for mixing the trains of said second motor control signal pulses with the trains of said first motor control signal pulses whereby the transmitted mixed signal pulse train includes both said first and second motor control signal pulses, means for reconstituting said trains of second motor control signal pulses from said received mixed signal pulse train, and means responsive to said reconstituted trains of second motor control signal pulses for controlling a second mode of operation of a different motor with each separate reconstituted train of second motor control signal pulses.

5. Apparatus as defined by claim 4 wherein said first motor control signal pulses control the direction of movement of said motors.

6. Apparatus as defined by claim 4 wherein said first motor control signal pulses control the direction of movement of said motors and said second motor control signal pulses control the speed of said motors.

7. In combination with a crane having at least two operating motors, a system for remotely controlling said motors comprising an operator-controlled transmitter located away from said crane and a crane receiver; said transmitter having means for generating a carrier signal, first operator-controlled means for generating a first train of periodic pulses, second operator-controlled means for generating a second train of pulses of like periodicity displaced timewise from pulses of said first train, means for modulating said carrier with said first and second pulse trains, and means for radiating said modulated carrier; said receiver having means for receiving said radiated modulated carrier and for deriving therefrom a detected signal constituting all of the pulses of said transmitted pulse trains, means responsive to the leading and trailing edges of each of said pulses in said detected signal for extracting pulses from said detected signal according to said first and second transmitted pulse trains, means responsive to extracted first train pulses for controlling one of said operating motors, and means responsive to extracted second train pulses for controlling the second of said operating motors.

8. In combination with a crane having at least two operating motors, a system for remotely controlling said motors comprising an operator-controlled transmitter located away from said crane and a crane receiver; said transmitter having means for generating a carrier signal, first operator-controlled means for generating a first train of periodic pulses having a first pulse width, second operator-controlled means for generating a second train of pulses of second pulse width and like periodicity displaced timewise from pulses of said first train, means modulating said carrier with said first and second pulse trains, and means for radiating said modulated carrier; said receiver having means for receiving said radiated modulated carrier and for deriving therefrom a detected signal constituting all of the pulses of said transmitted pulse trains, means responsive to the trailing edge of each pulse in said detected signal for generating control signals, means responsive to the leading edge of each pulse in said detected signal for generating first and second timing signals related respectively to said first and second pulse widths, means responsive to said control signals and said first and second timing signals for generating pulses in first and second channels respectively according to said pulses in said first and second transmitted pulse trains, means responsive to pulses in said first channel for controlling one of said operating motors, and means responsive to pulses in said second channel for controlling the second of said operating motors.

9. In combination with a crane having at least two reversible operating motors, a system for remotely controlling the operation and direction of said motors comprising an operator-controlled transmitter located away from said crane and a crane receiver; said transmitter having means for generating a carrier signal, first operator-controlled means for selectively generating a first train of periodic pulses of either of a first and second pulse width, second operator-controlled means for selectively generating a second train of pulses of like periodicity of either of a third and fourth pulse widths displaced timewise from pulses of said first train, means modulating said carrier with said first and second pulse trains, and means for radiating said modulated carrier; said receiver having means for receiving said radiated modulated carrier and for deriving therefrom a detected signal constituting all of the pulses of said transmitted pulse trains, first, second, third and fourth receiver pulse channels, means responsive to the leading and trailing edges of each pulse in said detected signal for selectively pulsing said first and second receiver pulse channels in response to first train pulses of said first and second pulse widths respectively, and for pulsing said third and fourth receiver pulse channels in response to second train pulses of said third and fourth pulse widths respectively, means operating said first motor in forward and reverse directions in response to pulses in said first and second receiver pulse channels respectively, and means operating said second motor in forward and reverse directions in response to pulses in said third and fourth receiver pulse channels respectively.

10. A system for remotely controlling the operation of a crane as in claim 9 wherein said receiver further includes means for providing a safety signal related to the strength of the received carrier, and a trigger circuit responsive when said safety signal falls below a preselected level for precluding the operation of both said first and second motors in either direction.

11. A system for remotely controlling the operation of a crane as in claim 9 wherein said receiver further includes means in each of said four receiver pulse channels for precluding the operation of either of said motors in either direction before first receiving a preselected number of pulses in the respective channel.

12. In combination with a crane having at least two reversible operating motors, a system for remotely controlling the operation and direction of said motors comprising an operator-controlled transmitter located away from said crane and a crane receiver; said transmitter having means for generating a carrier signal, first operator-controlled means for selectively generating a first train of periodic pulses of either of a first and second pulse widths, second operator-controlled means for selectively generating a second train of pulses of like periodicity of either of a third and fourth pulse widths displaced timewise from pulses of said first train, means modulating said carrier with said first and second pulse trains, and means for radiating said modulated carrier; said receiver having means for receiving said radiated modulated carrier and for deriving therefrom a detected signal constituting all of the pulses of said transmitted pulse trains, first, second, third and fourth receiver pulse channels, a control circuit for providing a control pulse of uniform duration commencing with the trailing edge of each pulse in said detected signal, first, second, third and fourth timing circuits all simultaneously actuated by the leading edge of each pulse in said detected signal and providing timing pulses commencing briefly before and terminating briefly after the trailing edges of said transmitter pulses of said first, second, third and fourth pulse widths respectively, gating means actuated by the outputs of said control and timing circuits for selectively pulsing said first and second receiver pulse channels in response to first train pulses of said first and second pulse widths respectively, and for pulsing said third and fourth receiver pulse channels in response to second train pulses of said third and fourth pulse widths respectively, means operating said first motor in forward and reverse directions in response to pulses in said first and second receiver pulse channels respectively, and means operating said second motor in forward and reverse directions in response to pulses in said third and fourth receiver pulse channels respectively.

13. A system for remotely controlling the operation of a crane as in claim 12 wherein said third and fourth transmitter pulse widths are both greater than said first and second transmitter pulse widths.

14. In combination with a crane having at least two operating motors, a system for remotely controlling the operation, direction and speed of said motors comprising an operator-controlled transmitter located away from said crane, and a crane receiver; said transmitter having means for generating a carrier signal, first operator-controlled means for selectively generating a first train of periodic pulse groups, second operator-controlled means for selectively generating a second train of pulse groups of like periodicity displaced timewise from pulse groups of said first train, pulses in each of said groups in said first and second pulse trains having preselected pulse widths characteristic of direction and speed respectively, means for modulating said carrier with said first and second pulse trains, and means for radiating said modulated carrier; said receiver having means for receiving said radiated modulated carrier and for deriving therefrom a detected signal constituting all of the pulses in said groups of said transmitted pulse trains, timing means responsive to the leading and trailing edges of each of said pulses in said detected signal for deriving and separating control pulses from said detected signal according to said pulse groups of said first and second transmitted pulse trains, means for operating said first motor in a forward or reverse direction in response to control pulses according to said pulse groups in said first pulse train, and means for operating said second motor in a forward or reverse direction in response to control pulses according to said pulse groups in said second pulse train.

15. A system for remotely controlling a crane in accordance with claim 14 wherein said timing means responsive to said leading and trailing edges of said detected signal includes a multivibrator for generating first gating pulses of uniform pulse width commencing with the trailing edge of each pulse in said detected signal, multivibrators for simultaneously generating timing pulses commencing with the leading edge of each pulse in said detected signal, said timing pulses being of duration briefly less than said preselected transmitted pulse widths, means for deriving second gating pulses from the trailing edges of said timing pulses, and means for combining said first and second gating pulses to derive and separate said control pulses.

16. In combination with a crane having at least first and second operating motors, a system for remotely controlling the operation, direction and speed of said motors comprising an operator-controlled transmitter located away from said crane, and a crane receiver; said transmitter having means for generating a carrier signal, first operator-controlled switching means for generating a first train of periodic pulse groups each of which groups includes a motor actuation pulse having a first width for initiating first motor operation at a predetermined forward speed and having a second width for initiating first motor operation in reverse at substantially the same speed together with a motor speed control pulse when selectively controlling the speed of said first motor at a value other than as predetermined by said motor actuating pulse of first or second width, second operator-controlled switching means for generating a second train of pulse groups of like periodicity each of which groups includes a motor actuation pulse having a third width for initiating second motor operation at a predetermined forward speed and having a fourth width for initiating second motor operation in reverse at substantially the same speed together with a motor speed control pulse when selectively controlling the speed of said second motor at a value other than as predetermined by said motor actuating pulse of third or fourth width, said pulse groups of said first pulse train being displaced timewise from said pulse groups of said second pulse train, means for modulating said carrier with said first and second pulse trains, and means for radiating said modulated carrier; said receiver having means for receiving said radiated modulated carrier and for deriving therefrom a detected signal constituting all of the pulses in said groups of transmitted pulse trains, first and second actuating circuits for operating said first motor at predetermined speed in forward and reverse directions respectively, third and fourth actuating circuits for operating said second motor at predetermined speed in forward and reverse directions respectively, means for varying the speed of said first and second motors, timing circuit means responsive to pulses of said first and second width in said detected signal for respectively operating said first and second actuating circuits and responsive to pulses of said third and fourth width in said detected signal for respectively operating said third and fourth actuating circuits, means responsive to the presence in said detected signal of pulses of first or second width for selectively applying first motor speed control pulses in said detected signal to said means for varying the speed of said first motor, and means responsive to the presence in said detected signal of pulses of third or fourth width for selectively applying second motor speed control pulses in said detected signal to said means for varying the speed of said second motor.

17. A system for remotely controlling a crane in accordance with claim 16, wherein the width of each of said motor speed control pulses in said first and second pulse trains is adjusted by said first and second operator-controlled switching means respectively, speed of the respective motor being a function of the respective speed control pulse width.

18. A system for remotely controlling a crane in accordance with claim 17, wherein the width of each of said speed control pulses is adjustable in a predetermined number of increments by said first and second operator-controlled switching means.

19. A system for remotely controlling a crane in accordance with claim 16, and including timing means at said transmitter for separating in time each motor speed control pulse in said first and second pulse trains from the respective motor actuation pulse, said timing means providing a fixed delay in each pulse group between the trailing edge of said motor actuation pulse of first, second, third and fourth widths and the leading edge of the respective motor speed control pulse.

20. A system for remotely controlling a crane in accordance with claim 19, wherein said third and fourth pulse widths are each greater than said first and second pulse widths, said motor speed control pulses selectable by said first and second operator-controlled switching means being of equal minimum and maximum width.

References Cited by the Examiner

UNITED STATES PATENTS

| | | | |
|---|---|---|---|
| 2,515,254 | 7/1950 | Nosker | 318—16 X |
| 2,529,804 | 11/1950 | Harnischfeger | 318—16 |
| 2,589,998 | 3/1952 | Dougherty | 318—16 X |
| 2,751,534 | 6/1956 | Jefferson et al. | 318—16 |
| 2,788,476 | 4/1957 | Shaw | 318—16 X |
| 2,877,398 | 3/1959 | Gimpel et al. | |
| 3,087,101 | 4/1963 | Lovejoy. | |
| 3,103,614 | 9/1963 | Mynall. | |
| 3,110,850 | 11/1963 | Young | 318—16 |

ORIS L. RADER, *Primary Examiner.*

MILTON O. HIRSHFIELD, *Examiner.*

T. LYNCH, *Assistant Examiner.*